US009537279B2

(12) United States Patent
Penumatcha et al.

(10) Patent No.: US 9,537,279 B2
(45) Date of Patent: Jan. 3, 2017

(54) MODULAR BACK SHELL APPARATUS FOR CIRCULAR CONNECTORS

(71) Applicant: Optical Cable Corporation, Roanoke, VA (US)

(72) Inventors: Venkata R. Penumatcha, Plano, TX (US); Rodney M. Flower, Richardson, TX (US)

(73) Assignee: Optical Cable Corporation, Roanoke, VA (US)

( * ) Notice: Subject to any disclaimer, the term of this patent is extended or adjusted under 35 U.S.C. 154(b) by 137 days.

(21) Appl. No.: 13/896,074

(22) Filed: May 16, 2013

(65) Prior Publication Data

US 2014/0041212 A1 Feb. 13, 2014

Related U.S. Application Data

(60) Provisional application No. 61/647,588, filed on May 16, 2012.

(51) Int. Cl.

| | |
|---|---|
| ***B23P 19/00*** | (2006.01) |
| ***H01R 43/00*** | (2006.01) |
| ***H01R 43/26*** | (2006.01) |
| ***H01R 13/56*** | (2006.01) |
| *H01R 13/512* | (2006.01) |
| *H01R 35/02* | (2006.01) |

(52) U.S. Cl.

CPC ............ *H01R 43/26* (2013.01); *H01R 13/562* (2013.01); *H01R 13/512* (2013.01); *H01R 35/02* (2013.01); *Y10T 29/53213* (2015.01)

(58) Field of Classification Search

CPC ................................................ Y10T 29/53213
USPC .............................................................. 29/748
See application file for complete search history.

(56) References Cited

U.S. PATENT DOCUMENTS

| | | | | |
|---|---|---|---|---|
| 3,636,501 | A * | 1/1972 | Walsh | 439/179 |
| 4,030,797 | A * | 6/1977 | Nieman | 439/248 |
| 4,158,473 | A * | 6/1979 | Shearer | 439/518 |
| 4,227,765 | A * | 10/1980 | Neumann et al. | 439/248 |
| 4,291,933 | A * | 9/1981 | Kakaris | 439/321 |
| 5,348,497 | A * | 9/1994 | Nitescu | 439/824 |
| 5,558,533 | A * | 9/1996 | Hashizawa et al. | 439/310 |
| 5,580,278 | A * | 12/1996 | Fowler et al. | 439/607.23 |
| 6,410,875 | B2 * | 6/2002 | Allard et al. | 218/118 |
| 6,419,519 | B1 * | 7/2002 | Young | 439/446 |
| 6,511,335 | B1 * | 1/2003 | Rayssiguier et al. | 439/191 |
| 6,602,085 | B2 * | 8/2003 | Young et al. | 439/321 |
| 2001/0025830 | A1 * | 10/2001 | Allard et al. | 218/118 |

(Continued)

*Primary Examiner* — Paul D Kim

(74) *Attorney, Agent, or Firm* — The Van Winkle Law Firm; William G. Heedy; David M. Carter

(57) ABSTRACT

A back shell apparatus receives a cable having conductors extending through the apparatus for attaching to a connector. The back shell includes at least two clam shell halves that mate to surround the conductors. The back shell allows for angular configurations of the cable and connector by including flexible bellows through which the conductors extend. The bellows are respectively expandable and retractable about the conductors. The back shell apparatus further includes a modular cable adapter that receives a respectively sized cable terminus from which the conductors extend into the bellows toward a connector. The back shell apparatus further includes a coupling nut adapter holding a respectively sized coupling nut that mates with the connector.

11 Claims, 8 Drawing Sheets

(56) References Cited

U.S. PATENT DOCUMENTS

| | | | | |
|---|---|---|---|---|
| 2009/0223674 | A1* | 9/2009 | Christie | 166/368 |
| 2014/0041212 | A1* | 2/2014 | Penumatcha et al. | 29/748 |

* cited by examiner

MODULAR BACK SHELL APPARATUS FOR CIRCULAR CONNECTORS

CROSS-REFERENCE TO RELATED APPLICATIONS

This application claims priority to and incorporates entirely by reference U.S. Provisional Patent Application Ser. No. 61/647,588 filed on May 16, 2012.

FIELD OF THE INVENTION

The invention relates to the field of connectors for electrical or optical cables having back shell assemblies to avoid disconnection problems due to environmental conditions such as vibration.

BACKGROUND

The art of electronic and fiber optic communications is replete with different kinds of connectors for numerous environments and specialized applications. Connector systems are already designed to resist extreme harsh mechanical and environmental conditions, including high vibration, mechanical and thermal shock, and fluid immersion. Also, these cables must continue to operate under extreme tension loading. It continues to be imperative, however, for new connector designs to maintain the integrity of the electrical cables and optical fibers being connected and to minimize damage in every way possible.

With so many different kinds of connectors available to system installation professionals, it is difficult to ensure that a proper cable intersects an appropriate mate with a convenient connector that also protects the underlying fibers. A problem exists in the field of electrical and fiber optic connectors in that the connectors remain limited in versatility and are not designed with sufficient weatherproof and hazard-proof bodies to protect the conductors therein.

The art of electrical and fiber optic cables also relies particularly on connector accessories utilizing back shells through which cables run, and the back shells mate with circular connectors. Circular connectors for various applications, such as military and aerospace applications, have been used for many years. Because these connectors are often to subject to vibrations, they often include anti-decoupling features. An example of such a connector is shown in U.S. Pat. No. 4,291,933. Back shells, devices that extend longitudinally along an extension of cable, are often used with such connectors to provide a transition between the connector and the cable. In addition, these back shells often provide strain relief for the cable jacket, the shield, or individual conductors within the cable. These conductors may be either electrical conductors or optical fibers and the connector may be an electrical connector or an optical fiber connector or a hybrid connector with electrical and fiber optic members. The back shell is connected between one end of the connector and the cable with the individual conductors extending through the back shell and terminated within the connector. Examples of back shells are shown in U.S. Pat. Nos. 5,580,278 and 6,602,085.

One of the problems associated with back shells is that a different back shell is used for different connectors. This problem increases tooling costs and causes inventory complexities. In addition, each individual connector is often offered with three different back shells styles which are constructed at a ninety degree (90°) angle, a forty-five degree (45°) angle, and straight. Thus, there is a need for an improved back shell apparatus which overcomes the problems of the prior art as well as the need for cables to be integrally sealed with the connectors.

BRIEF SUMMARY OF THE INVENTION

In one embodiment, an apparatus for attaching a cable to a connector includes a cable adapter receiving a cable terminus through which conductors extend and a retainer tube positioned within the apparatus to secure the cable terminus between said retainer tube and said cable adapter, wherein the conductors extend through said adapter and said retainer tube.

In another embodiment, an apparatus for attaching a cable to a connector through a back shell assembly includes a coupling nut adapter positioning a coupling nut within the back shell assembly and the coupling nut receives conductors from the cable there through. The coupling nut mates with the connector receiving the conductors.

In yet another embodiment, an apparatus for receiving a cable having conductors extends through the apparatus for attaching to a connector, and the apparatus includes a back shell with at least two clam shell halves that mate to surround the conductors. Bellows extend through the clam shell halves and are positioned between the conductors and the clam shell halves. The conductors extend from the cable toward the connector through the bellows.

DETAILED DESCRIPTION

Terms used herein are intended to have their broadest plain meanings. For example, the terms “cable” and “conductor” are not limited to any single application, thereby including electrical and fiber optic cables or conductors as well as hybrids thereof.

Figure 1:
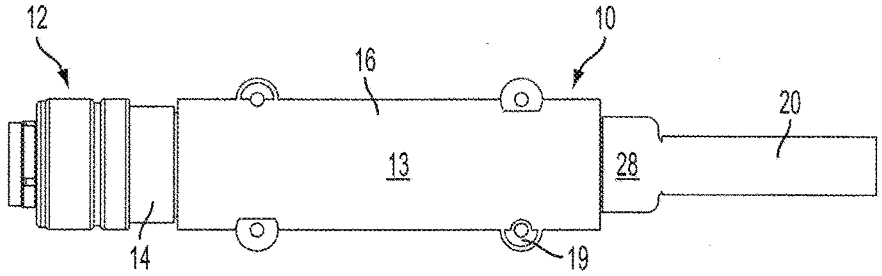
FIG. 1 is a side plan view of a modular back shell assembly and connector system according to the disclosure herein.
Figure 2:
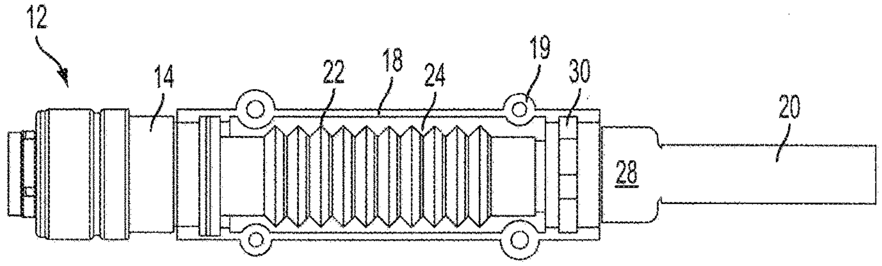
FIG. 2 is a side plan view of the interior of the modular back shell assembly and connector system of FIG. 1 with a front half of the back shell assembly removed.

In one embodiment, a back shell apparatus 10 attaches a cable 20 to a connector 12 by receiving one end of the cable 10, the end referred to herein as a cable terminus 9. Conductors 26 extend from the cable 10 through the cable terminus 9 and into the back shell apparatus 10 for ultimate attachment to a connector 12. Referring now more particularly to FIGS. 1 and 2, there is provided a back shell apparatus 10 attached to connector 12 by coupling nut 14. Connector 12 may be an electrical or fiber optic connector. Back shell apparatus 10 is in the form of a dam shell that includes two identical halves 16 and 18. Each clam shell half 16 and 18 includes four eyelets 19. The eyelets 19 on one clam shell half are placed in register with the eyelets 19 on the other clam shell half. Four screws and nuts (not shown) or four self threading screws are used to secure the clam shell halves together. Upon connecting the clam shell halves about a conductor (26), the clam shell halves form an overall back shell (13) that protects the conductors and provides additional functionality. Cable 20 contains a plurality of individual insulated conductors 26, which may be electrical conductors or optical fibers. The cable 20 is connected to an end of the back shell apparatus 10 that is opposite the connector 12. Collapsible and flexible bellows 22 is interposed between cable 20 and connector 12. Hollow space 24 surrounds the outside of the bellows 22 within the walls of the each clam shell 16 and 18.

Figure 3:
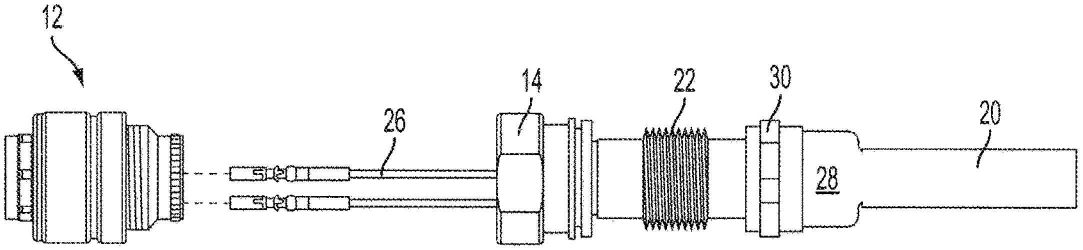
FIG. 3 is an exploded view of the interior of the modular back shell adapter of FIG. 1.
Figure 4:
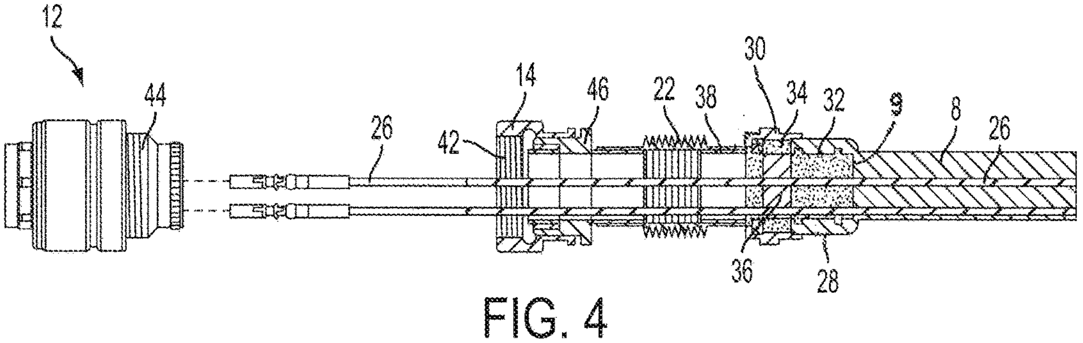
FIG. 4 is a side cross section view of the interior section of the exploded view shown in FIG. 3.

FIGS. 3 and 4 show the connector system with the clam shells 16 and 18 removed and with the connector 12 having not yet been assembled to the other parts of the system. Bellows 22 is in its collapsed position so that the conductors 26, which may be electrical conductors or optic fibers, extend well beyond coupling nut 14 so that those conductors may be easily terminated within connector 12. Once termination has been completed, coupling nut 14 is pulled toward the connector 12, thereby expanding the bellows 22 to the position shown in FIG. 2. After the bellows 22 has been expanded, the clam shells 16 and 18 are connected together over the bellows, and coupling nut 14 is used to secure the back shell apparatus 10 to the connector 12.

Figure 5:
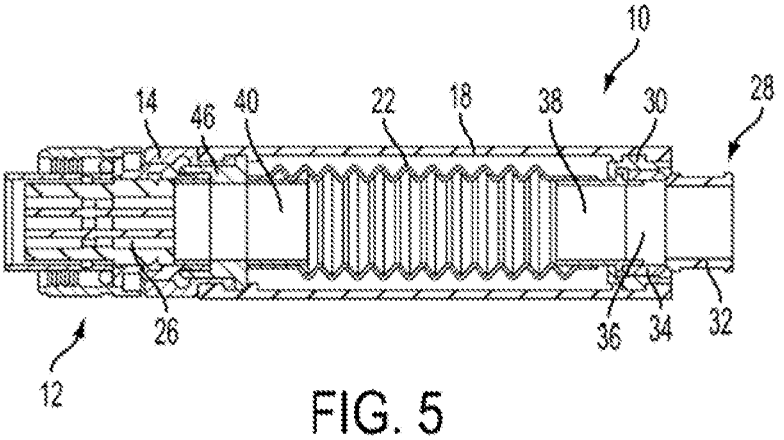
FIG. 5 is a cross section view of the modular back shell assembly of FIG. 1.

Referring now more particularly to FIG. 5, which is a cross-sectional view of FIG. 2, aramid yarn band retainer tube 28 protrudes out of one end of the back shell apparatus 10 opposite the connector 12 and is held in place by threaded cable adapter 30. The cable adapter receives one end of the cable 20 there through and defines an opening through which conductors 26 extend into the back shell apparatus 10. Recessed surface 32 of tube 28 receives aramid yarn strengthening member or members from the inside of cable 20, such that in one embodiment, the cable jacket extends over the recessed surface 32 of the retainer tube 28. That is, the aramid yarn of the cable jacket is sandwiched between the recessed surface 32 and crimped thereto. This provides strain relief for the conductor 26.

The retainer tube 28 extends from inside the back shell apparatus 10 and protrudes out of the back shell apparatus 10 as shown best in FIG. 4. The exposed portion of the retainer tube 28 includes rims that define a recessed surface 32 for crimping a cable 20 jacket thereto. The retainer tube is positioned within the apparatus to secure the cable terminus 9 between the retainer tube 28 and the cable adapter 30. Conductors, therefore, extend through the cable adapter 30 and the retainer tube 28.

The cable adapter is selectable is selectable among a plurality of cable adapters having respectively sized passages for a respectively sized cable terminii (9). Each cable adapter 30 available for use with the back shell apparatus (10) disclosed herein defines an appropriately sized passage to receive a correspondingly sized cable terminus (9). In this regard, the cable adapter 30 is removable and replaceable for the size of the cable 20 at hand.

“O” ring 34 is situated between retainer tube 28 and the cable adapter 30 for sealing purposes. Grommet 36, having a plurality of holes therein for receiving the conductors 26 from cable 20, is located adjacent to the retainer tube 28. In one embodiment, the grommet 36 is positioned within the retaining tube, and the grommet 36 defines openings through which conductors from the cable terminus 9 extend. Preferably, grommet 36 is made of an elastomeric material. Compression sleeve 38 is connected between grommet 36 and bellows 22. Compression sleeve 38 compresses the grommet so as to collapse and seal the holes therein after the conductors 26 have been passed through the holes to prevent moisture from penetrating to the inside of the bellows 22. Spline adapter 40 is connected to the other side of bellows 22 and to the plug housing of connector 12. Preferably, bellows 22 is made of a thermoplastic elastomer or a thermal set rubber. Suitable materials include silicone and rubber. As previously indicated, bellows 22 must be collapsible, flexible and impervious to moisture. It should be noted that connectors, such as connector 12, typically have splines or serrations and a threaded feature on the back end of the connector, where the back shell apparatus attaches. For a back shell apparatus 10 to attach to a variety of connectors 12 it must have both the correct thread geometry as well correct spline/serration geometry. Thus a back shell apparatus 10 must use a correct combination of coupling nut and spline/serration adapters to be modular with respect to the connector attachment. Multiple pairings of coupling nut and spline/serration adapters can be fitted to a given back shell apparatus because the coupling nut adapter is selectable to hold an appropriate coupling nut that mates with a respectively selectable connector. The conductors extend through the back shell apparatus 10 and into the respectively selectable connector 12 attaching to the back shell apparatus 10. Additionally, there are some connectors that are not "keyed" with spline/serration, and depend upon friction to position a particular polarization (axially rotational).

Coupling nut 14 is modular in nature. That is, a coupling of one size can easily be exchanged for a coupling of another size to conform to the particular connector 12 which is being used. In some cases, a single coupling nut size can work with multiple varieties of connectors without the need to exchange the coupling nuts. However, the threads 42 of coupling nut 14 must conform to the threads 44 on the back side of connector 12. Coupling nut adapter 46 is selectable to hold an appropriate coupling nut 14 that mates with a respectively selectable connector 12 such that the conductors 26 extend through the back shell apparatus 10 and into the respectively selectable connector 12 attaching to the back shell apparatus 10. Coupling nut adapter 46 conforms to various sizes of coupling nuts 14 to help accommodate this modularity. Coupling nut adapter 46, therefore, is selectable, removable and replaceable by opening the claim shell halves 16 and 18.

Figure 6B:
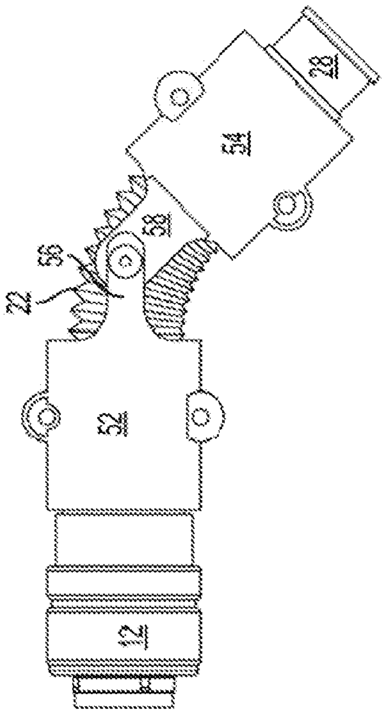
FIG. 6B is a side plan view of a connector and hinged back shell assembly.
Figure 6A:
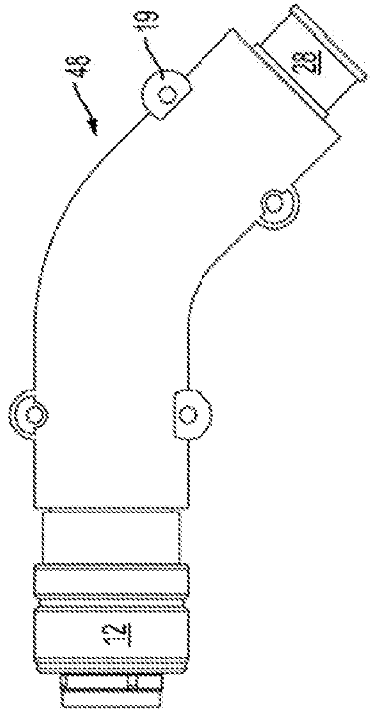
FIG. 6A is a side plan view of a connector and a fully enclosed back shell assembly defining an angular configuration.
Figure 7B:
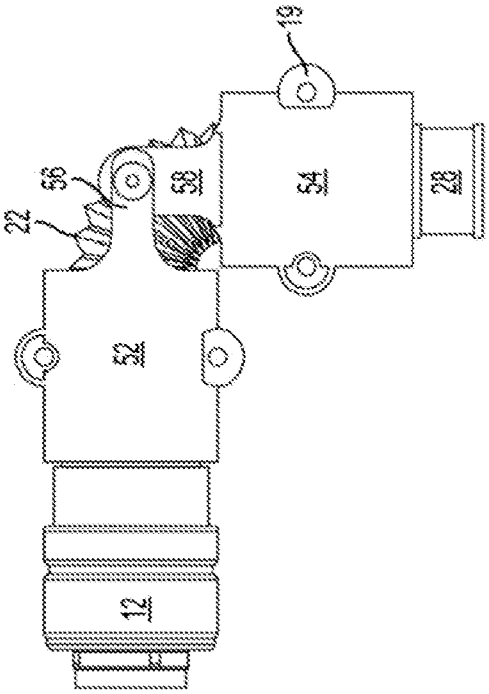
FIG. 7B is a side plan view of a connector and a hinged back shell assembly defining a ninety degree angle.
Figure 7A:
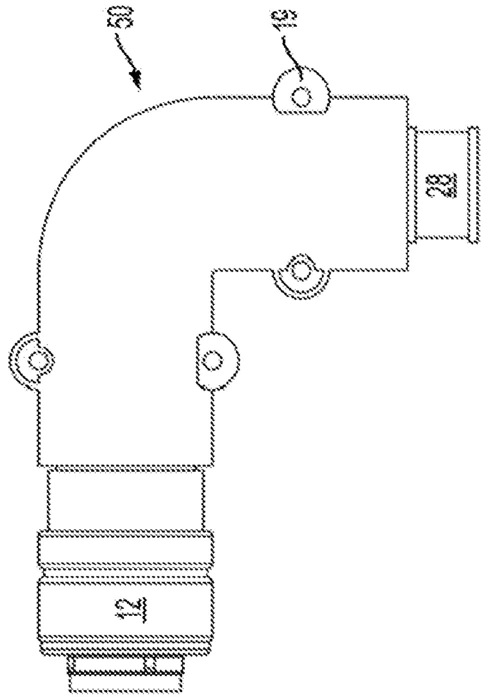
FIG. 7A is a side plan view of a connector and a fully enclosed back shell assembly defining a ninety degree angle.
Figure 8:
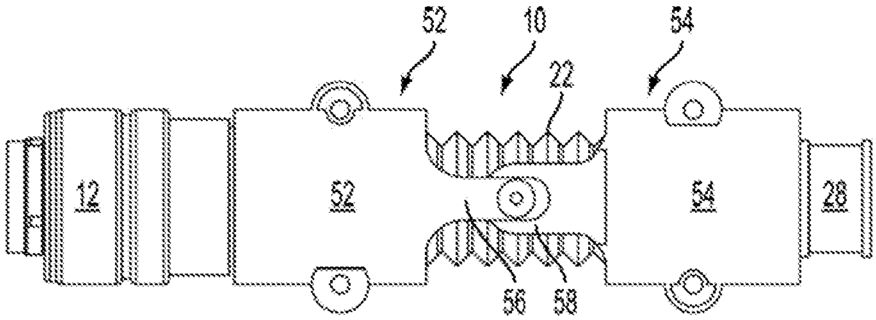
FIG. 8 is a side plan view of a connector and hinged back shell assembly defining a straight conduit.
Figure 9:
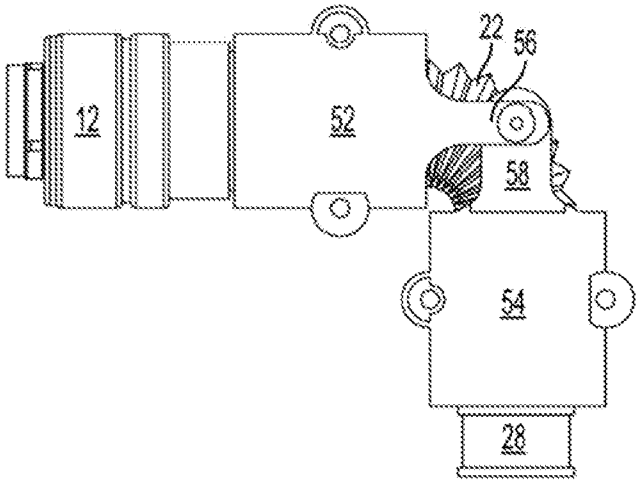
FIG. 9 is a side plan view of a connector and hinged back shell assembly defining a conduit with a ninety degree angle.
Figure 10:
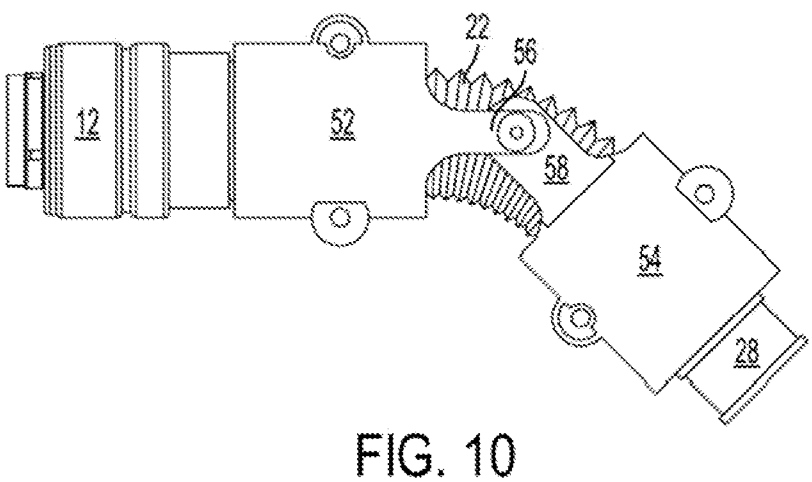
FIG. 10 is a side plan view of a connector and hinged back shell assembly defining a conduit with a forty five degree angle.

In addition to the straight embodiment of the back shell apparatus shown in FIG. 1, FIG. 6 illustrates back shell apparatus 48 with a 45 degree angle, and FIG. 7 illustrates back shell apparatus 10 having a 90 degree angle. Since bellows 22 is angularly flexible as well as axially collapsible, these two alternative designs shown in FIGS. 6 and 7 may be accomplished utilizing the features or attributes of this invention. FIGS. 8, 9 and 10 illustrate how the invention may be applied to back shell apparatus systems which may be used at any angle between zero (0) and plus ninety degrees (+90°). In the embodiments of FIGS. 8 through 10, two back shell apparatus units 52 and 54 are utilized. Each back shell apparatus unit is in the form of a clam shell. Back shell apparatus units 52 and 54 may be positioned at the desired angle. Back shell apparatus unit 52 is connected to back shell apparatus unit 54 by two pairs of ears 56 and 58, each having a hole therein, and are coupled together by screw and nut or screw and tapped hole in ears. The four clam shell halves which comprise the back shell apparatus units 52 and 54 may be identical thus enabling them to be manufactured using a single mold. Alternatively, two of the four halves may be identical. The connection of the ears 56, 58 provides a hinged embodiment of the clam shell arrangement, allowing rotation of the clam shell apparatus about at least one axis. Since bellows 22 is flexible, angular positioning of the back shell apparatus units is not inhibited.

In one embodiment, the back shell apparatus 10, therefore, receives a cable 20 having conductors 26 extending through the back shell apparatus 10. Thus, bellows 22 performs at least three functions, namely, (1) a moisture seal which prevents moisture from affecting the electrical conductors or optical fibers, (2) it is collapsible so that the electrical conductors or optical fibers may be easily terminated to connector 12, and (3) it is bendable so that the system may be used at various angles as shown in FIGS. 6 through 10. In addition, since the bellows 22 is impermeable to moisture, the region 60 between back shell apparatus units 52 and 54 may be left open as shown in FIGS. 8 through 10, which enables swiveling and results in a substantial savings in materials. Alternatively, a loose jacket or shield may be placed around region 60 to protect the bellows from damage.

This invention provides for a versatile connector back shell apparatus platform cable adaptor and strain relief function. In one embodiment, a two piece clam shell vessel is provided and includes a pair of straight half shells to form a straight back shell apparatus arrangement. Alternatively, a pair of forty-five degree (45°) half shells to form a forty-five degree (45°) back shell apparatus arrangement is provided. As a further alternative, a pair of ninety degree (90°) half shells to form a ninety degree (90°) back shell apparatus arrangement is provided.

In addition, two pairs of universal half shells form a universal cable/connector, including cable strain relief, between zero (0) and plus ninety degrees (90°) polarity. Each half of the two or four piece clam shells may be identical regardless of straight, forty-five (45), ninety (90), or universal arrangement. One end of the half clam shell accommodates a provision for integrating a coupling nut/spline adapter with modularity to provide a multitude of various mechanical interfaces for circular connectors including military-style connectors. The other end of the half clam shell accommodates a provision for a modular cable attachment feature and can be provisioned to provide a combination for (a) electrical cable, (b) fiber optic cable, or (c) for interface to mechanical thread. Both the modular coupling nut/spline adapter unit and modular cable attaching unit provide interface to an inward bellow seal. Both the modular coupling nut unit and modular cable attaching unit form seals when coupled to the outward end connector or when attached to a cable, respectively. The bellow seal is attached to the inward tubular feature of both the spline serration adapter and the cable attaching unit to form an environmental seal within the tubular back shell apparatus encasement structure. The bellow seal can axially collapse to expose the fiber optic members or electrical cable members and then be stretched in length to be sandwiched between the dam shell halves.

Figure 11:
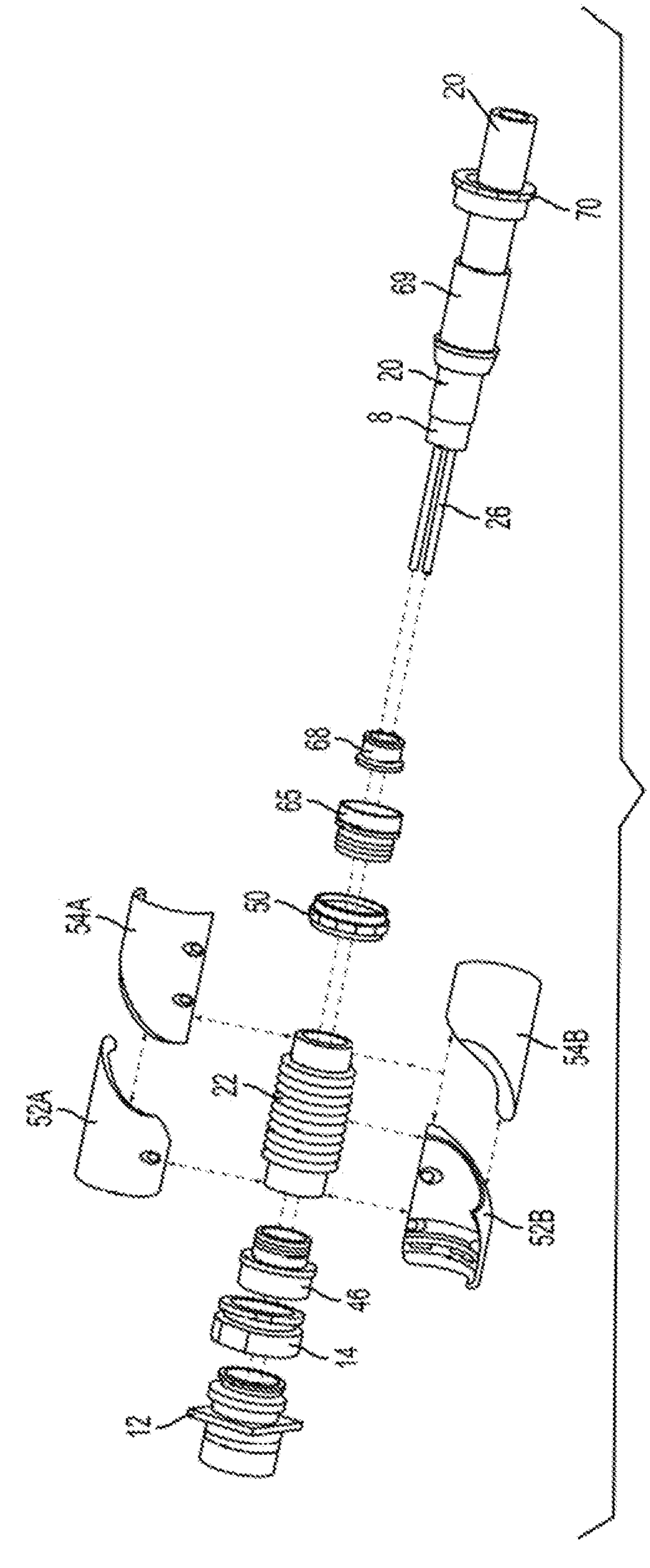
FIG. 11 illustrates an exploded view of a second embodiment of the back shell apparatus disclosed herein utilizing a twistable clam shell configuration.
Figure 12A:
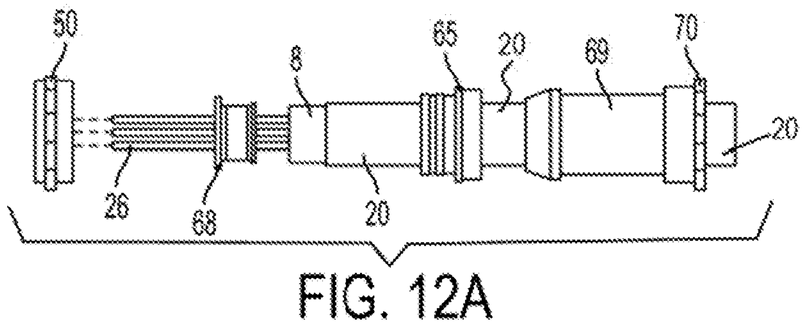
FIG. 12A illustrates an exploded view of a sub-assembly of the back shell apparatus of FIG. 11 with the subassembly extending between a rear cap receiving an incoming cable and a compression nut that engages clam shell halves.
Figure 12B:
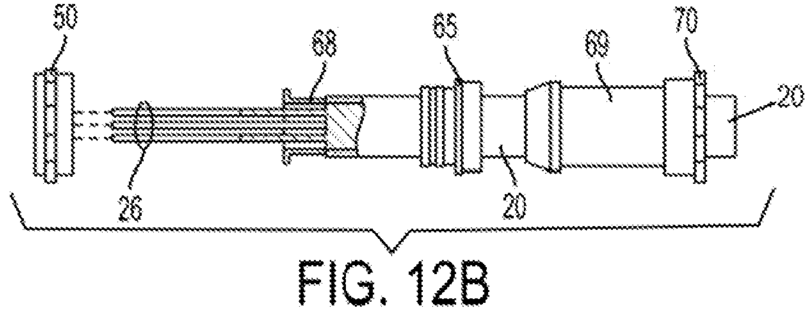
FIG. 12B is an exploded view of the subassembly of FIG. 12A with a retainer tube moved over a cable strengthening member and away from the compression nut.
Figure 12C:
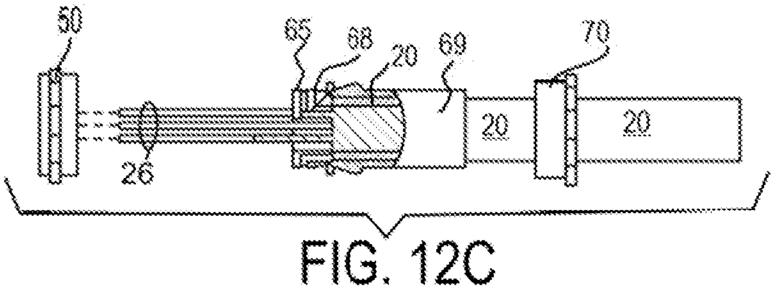
FIG. 12C is an exploded view of the subassembly of FIG. 12B with a boot moved away from the rear cap and toward the retainer tube holding an incoming cable.
Figure 12D:
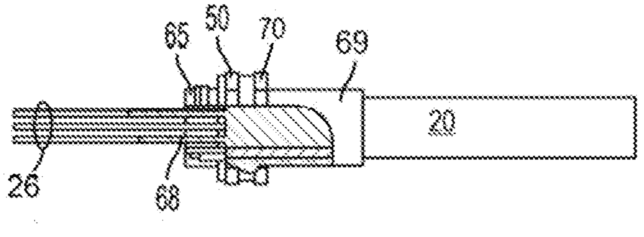
FIG. 12D is an exploded view of the subassembly of FIG. 12C with the compression nut moved toward the boot and the rear cap moved toward the compression nut.
Figure 13:
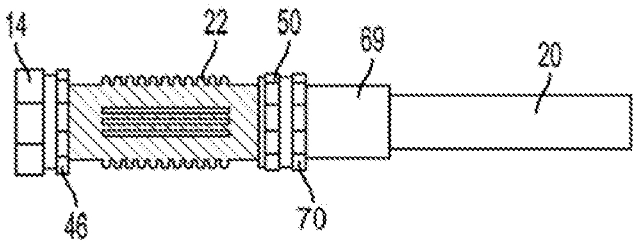
FIG. 13 is a side plan view of a second sub assembly of FIG. 11 with the subassembly of FIGS. 12A-12E attached to the bellows and coupling nut of FIG. 11.
Figure 14A:
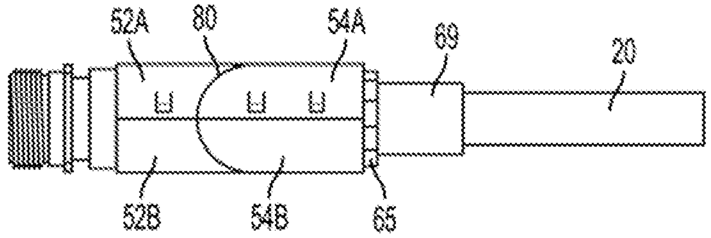
FIG. 14A illustrates a side plan view of the back shell apparatus of FIG. 11 with the clam shell halves engaged and parallel to a longitudinal axis of an incoming cable.
Figure 14B:
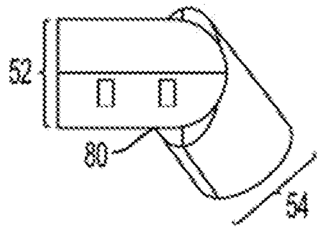
FIG. 14B illustrates a top perspective view of the back shell apparatus of FIG. 14A with one half of the clam shells twisted at a 45 degree angle along an axis of clam shell rotation.
Figure 14C:
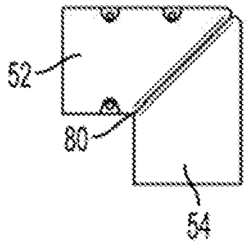
FIG. 14C illustrates a side plan view of the back shell apparatus of FIG. 14A with one half of the clam shells twisted at a 90 degree angle along an axis of clam shell rotation.

Another embodiment of the invention is set forth in FIGS. 11-13. Again, a cable 20 incorporates at least one conductor 26, which may be electrical conductors or optical fibers. In this embodiment, which does not limit the invention disclosed herein, the cable 20 does not include the terminus 9 discussed in relation to FIGS. 1-10 and inserted into the cable adapter 30. The cable 20 is prepared instead to run through the back shell apparatus 10 to a point beyond a cable adapter 65. A strengthening member 8 extends from the cable 20 and attaches to a retainer tube 8 through which the conductors 26 extend as shown in FIG. 11. The retainer tube 68 fits securely within the cable adapter 65 to provide a stabilizing effect on the conductors 26 and to minimize disconnections due to vibration or other environmental factors. Again, the use of the retainer tube 68 and the cable adapter 65 provide an avenue for the back shell apparatus 10 to accommodate numerous sizes of cables 20. Both the cable adapter 65 and the retainer tube 68 are removable and replaceable with selectable cable adapters and retainer tubes that accommodate any necessary cable size.

The embodiment of FIGS. 11-13 includes a boot 69 in the form of a hollow tube sized to accommodate a respective cable 20 through the boot. The boot 69 includes a raised lip 72 at one end that engages a circumference of the cable adapter 65. The boot, therefore, provides another avenue to adjust the overall back shell assembly 10 to fit cables 20 of varying sizes because the boot 69 could be customized to allow a certain kind of cable to pass there through and still be securable to the cable adapter 65. In this embodiment, the cable adapter 65 presses against and engages the raised lip 72 on the boot 69, which may be made of numerous rubbers or plastics that are flexible and malleable for the use at hand. As shown in FIG. 11, a compression nut 50 mates via appropriate threading to the cable adapter 65 which is likewise a threaded device. The compression nut 50 includes a ridge about an outer circumference that reduces the tendency for the compression nut, the adapter, and therefore the cable to rotate during use. A rear cap 70 is separate from the boot 69 as shown in FIG. 12C and engages the compression nut 50 as shown in FIG. 12D.

The cable adapter 65 is further characterized in that it is selected to fit bellows 22 used in this second embodiment in a way that is similar to the bellows discussed above. The bellows 22 is sufficiently elastic and flexible in most directions to allow for creating angular shapes with the conductors 26 extending through the bellows 22. As shown in FIG. 11, the coupling nut adapter 46, also used in this embodiment, secures to the bellows to hold the bellows in place. Similar to the disclosure above, the coupling nut adapter 46 is sized to accommodate an appropriate coupling nut 14 for the use at hand. The coupling nut adapter and associated coupling nut are both removable and selectable to fit an appropriate connector 12 as shown in FIG. 12E.

The clam shell embodiment described above for the back shell configuration is also evident in FIGS. 11-13. Pairs of clam shell halves (52, 54) attach to form a curved seam 80 shown best in FIG. 13A. With the connection points of the clam shell halves curved as shown, the back shell apparatus 10 of FIGS. 11-13 allow for a twisting function that establishes the angular embodiments of FIGS. 13B (a forty five degree angle) and FIG. 13C (a ninety degree angle). FIG. 13A illustrates a standard straight configuration.

From the foregoing description of embodiments of the invention, it will be apparent that many modifications may be made therein. It will be understood that these embodiments of the invention are exemplifications of the invention only and that the invention is not limited thereto.

The invention claimed is:

1. An apparatus for attaching an electrical cable to a connector, the apparatus comprising:

a cable adapter receiving a cable terminus, the cable terminus being sized and configured for permitting conductors to extend therethrough;

a retainer tube sized and configured for securing the cable terminus between said retainer tube and said cable adapter, wherein the conductors extend through said cable adapter and said retainer tube;

bellows, wherein an end of said bellows is positioned adjacent to said cable adapter and said retaining tube, and wherein the conductors extend from the cable terminus through said adapter, through said retaining tube and through said bellows, said bellows being selectively expandable and retractable in the axial direction relative to the conductors; and a back shell surrounding said bellows, and said back shell being sized and configured such that hollow space between said bellows and said back shell permits said bellows to expand and retract therein.

2. An apparatus according to claim 1, further comprising a grommet positioned within said retaining tube, said grommet defining openings through which the conductors from the cable terminus extend.

3. An apparatus according to claim 2, further comprising a compression sleeve extending around said grommet to seal the openings about the conductors.

4. An apparatus according to claim 1, wherein said cable adapter defines an appropriately sized passage to receive a correspondingly sized cable terminus.

5. An apparatus according to claim 4, wherein said cable adapter is selectable among a plurality of cable adapters having respectively sized passages for a respectively sized cable terminii.

6. An apparatus according to claim 1, wherein said retaining tube comprises a recessed surface, wherein said recessed surface receives an outer jacket surrounding the cable when said adapter receives the cable terminus.

7. An apparatus according to claim 6, wherein said retaining tube comprises an aramid yarn.

8. An apparatus according to claim 1, wherein the conductors are optical fibers.

9. An apparatus according to claim 1, wherein the conductors are electrical conductors.

10. An apparatus according to claim 1, wherein the back shell defines an angle through which the conductors bend.

11. An apparatus according to claim 10, wherein the back shell comprises two clam shell halves that connect to surround the conductors.

* * * * *